United States Patent
Snuttjer (10) Patent No.: US 8,783,027 B2
(45) Date of Patent: Jul. 22, 2014

(54) PRESSURE REGULATION CIRCUIT FOR TURBINE GENERATORS

(75) Inventor: Owen R. Snuttjer, Pittsboro, NC (US)

(73) Assignee: Siemens Energy, Inc., Orlando, FL (US)

( * ) Notice: Subject to any disclaimer, the term of this patent is extended or adjusted under 35 U.S.C. 154(b) by 1342 days.

(21) Appl. No.: 12/562,211

(22) Filed: Sep. 18, 2009

(65) Prior Publication Data
US 2011/0070063 A1 Mar. 24, 2011

(51) Int. Cl.
*G05D 16/20* (2006.01)

(52) U.S. Cl.
USPC ....... 60/456; 60/912; 137/487.5; 137/599.07; 137/599.11; 137/601.01; 137/601.14; 251/30.01; 700/301

(58) Field of Classification Search
CPC .............. G05D 16/20; G05D 16/2006; G05D 16/2086; G05D 16/2093
USPC .................... 137/485, 487.5, 505.11, 599.01, 137/599.05, 599.06, 599.07, 599.11, 137/601.01, 601.14; 251/30.01; 700/301; 60/456, 806, 912
See application file for complete search history.

(56) References Cited

U.S. PATENT DOCUMENTS

| | | | |
|---|---|---|---|
| 4,069,292 A * | 1/1978 | Herrington et al. | 264/40.3 |
| 4,527,385 A * | 7/1985 | Jumelle et al. | 60/806 |
| 4,792,911 A | 12/1988 | Gonzalez et al. | |
| 5,078,930 A * | 1/1992 | Herrington, Jr. | 264/40.3 |
| 5,097,669 A | 3/1992 | Hargrove et al. | |
| 5,785,114 A | 7/1998 | Armstrong et al. | |
| 5,954,089 A * | 9/1999 | Seymour | 137/487.5 |
| 6,450,200 B1 * | 9/2002 | Ollivier | 137/624.12 |
| 6,460,566 B1 | 10/2002 | Perry et al. | |
| 6,708,552 B2 | 3/2004 | Weldon | |
| 6,917,858 B2 * | 7/2005 | Boger | 700/282 |
| 7,007,707 B2 * | 3/2006 | Ambrosina et al. | 137/9 |
| 7,370,666 B2 * | 5/2008 | Willets et al. | 137/487.5 |
| 7,421,854 B2 * | 9/2008 | Shaffer et al. | 62/500 |
| 7,505,818 B1 * | 3/2009 | Kohler | 700/19 |
| 2006/0156793 A1 | 7/2006 | Brosnihan et al. | |
| 2006/0169327 A1 * | 8/2006 | Shajii et al. | 137/487.5 |

* cited by examiner

*Primary Examiner* — William McCalister (57) ABSTRACT

A pressure regulation circuit delivers pressurized fluid into a generator. The circuit includes pressure regulator structure and a primary valve. The pressure regulator structure outputs pressurized fluid at a predetermined output pressure that is greater than a desired operating pressure of the generator and less than a predetermined upper alarm pressure. The primary valve is downstream from the pressure regulator structure and is selectively opened and closed by a controller based on the pressure within the generator. The controller opens the primary valve to allow the pressurized fluid outputted from the pressure regulator structure to flow into the generator upon the pressure within the generator being at or below a predetermined lower limit. The controller closes the primary valve to prevent the pressurized fluid outputted from the pressure regulator structure from flowing into the generator upon the pressure within the generator being at or above a predetermined upper limit.

20 Claims, 4 Drawing Sheets

PRESSURE REGULATION CIRCUIT FOR TURBINE GENERATORS

FIELD OF THE INVENTION

The present invention generally relates to a pressure regulation circuit for use in a turbine generator, and more particularly, to a pressure regulation circuit that controls a flow of a pressurized fluid into the turbine generator.

BACKGROUND OF THE INVENTION

Within the power generation industry, large-scale power generators convert mechanical energy, typically the energy output of a turbine rotor, into electrical energy. Such power generators typically include a frame-supported stator and a rotor positioned to rotate within the stator, so as to induce electrical current through conductors moving through a magnetic field set up within the stator. The current may be conducted to a power plant bus for eventual power distribution to consumers, commercial establishments, and any other users of electrical power.

Components within a typical generator frame require cooling to prevent overheating thereof. A cooling medium that is often used in such generator frames is pressurized hydrogen gas, which may be introduced into the generator frame from an external source. While it is preferable to minimize leakage of the hydrogen gas out of the generator frame, a small amount of hydrogen gas may leak through shaft seal assemblies, gasketed covers and sealed joints, which are typically used to prevent the hydrogen gas from escaping from the generator frame. Typically, the pressure of the hydrogen gas within the generator frame is controlled by a self-operated pressure regulator set at a desired operating pressure within the generator frame. The desired operating pressure is set between upper and lower alarm pressures to maintain the pressure within the generator frame at a safe and acceptable level.

To indicate undesired high levels of leakage of the hydrogen gas out of the generator frame, a flow meter is typically used to monitor input of the hydrogen gas entering the generator frame. Disadvantages of such flow meters include cost and complexity of the system. Alternatively, hydrogen gas consumption can be measured manually by measuring a drop in gas pressure over a time interval. The manual process requires manual operation of the hydrogen supply and may not provide a timely indication of a sudden change in hydrogen gas consumption.

SUMMARY OF THE INVENTION

In accordance with one aspect of the present invention, a pressure regulation circuit is provided for delivering pressurized fluid into a generator, the pressure regulation circuit is associated with a controller capable of determining a pressure within the generator. The pressure regulation circuit comprises a main circuit including pressure regulator structure and a primary valve. The pressure regulator structure receives fluid and outputs pressurized fluid at a predetermined output pressure, the predetermined output pressure being greater than a desired operating pressure of the generator and being less than a predetermined upper alarm pressure. The primary valve is downstream from the pressure regulator structure and is selectively opened and closed by the controller based on the pressure within the generator determined by the controller. The controller opens the primary valve to allow the pressurized fluid outputted from the pressure regulator structure to flow into the generator upon the pressure within the generator being at or below a predetermined lower limit, the predetermined lower limit being no greater than the desired operating pressure of the generator. The controller closes the primary valve to prevent the pressurized fluid outputted from the pressure regulator structure from flowing into the generator upon the pressure within the generator being at or above a predetermined upper limit, the predetermined upper limit being no greater than the predetermined output pressure and being greater than the predetermined lower limit.

The pressure regulator structure may include a pressure regulator, and may also include a pressure gauge and a vent valve.

The pressure regulation may include a relief valve downstream from the primary valve for selectively releasing an amount of the pressurized fluid from the pressure regulation circuit.

The pressure regulation circuit may include a bypass circuit including a bypass valve that is normally in a closed position but can be selectively opened when it is desired to bypass the main circuit.

The bypass circuit may be branched off from the main circuit at a location upstream from a first secondary valve of the main circuit that is upstream from the pressure regulator, and the bypass circuit may rejoin the main circuit downstream from a second secondary valve of the main circuit that is downstream from the primary valve. The first and second secondary vales are normally in open positions but can be selectively closed to prevent flow through the main circuit.

The fluid may comprise hydrogen gas.

The predetermined output pressure may be set at about 3 psi above the desired operating pressure. The predetermined upper alarm pressure may be set at about 5 psi above the desired operating pressure. The predetermined lower limit may be set at about the desired operating pressure. The predetermined upper limit may be set at about 1 psi above the desired operating pressure.

The controller may receive temperature and pressure readings inside the generator from at least one sensor, wherein the temperature and pressure readings are used to determine leakage of the pressurized fluid from the generator.

In accordance with a second aspect of the present invention, a method is provided for operating a generator. A pressurized fluid is provided at a predetermined output pressure, the predetermined output pressure being greater than a desired operating pressure of the generator and being less than a predetermined upper alarm pressure. A pressure within the generator is detected. The pressurized fluid is allowed to flow into the generator if the pressure within the generator is determined to be at or below a predetermined lower limit, the predetermined lower limit being no greater than the desired operating pressure of the generator and being greater than a predetermined lower alarm pressure. The pressurized fluid is prevented from flowing into the generator upon the pressure within the generator being at or above a predetermined upper limit, the predetermined upper limit being no greater than the predetermined output pressure and being greater than the predetermined lower limit.

A temperature within the generator may be detected.

The detected pressure and temperature may be used, along with a known volume within the generator, a known molar mass of the pressurized fluid, and the universal gas constant to determine the mass of pressurized fluid within the generator at a first time.

The pressure and temperature within the generator corresponding to a second time may be detected. The detected pressure and temperature corresponding to the second time may be used, along with the known volume within the generator, the known molar mass of the pressurized fluid, and the universal gas constant to determine the mass of pressurized fluid within the generator at the second time.

Leakage of the pressurized fluid from the generator may be determined by calculating a difference between the mass of the pressurized fluid at the first time and the mass of the pressurized fluid at the second time.

In accordance with a third aspect of the present invention, a method is provided for determining leakage of a pressurized fluid from a generator. First and second pressures and temperatures of the pressurized fluid within the generator are detected at a first time and a second time, respectively. The leakage of the pressurized fluid from the first time to the second time is calculated based on at least the first pressure, the first temperature, the second pressure, and the second temperature. The generator is shut down if the calculated leakage of the pressurized fluid from the first time to the second time exceeds a predetermined limit.

The first time may correspond to first pressure and temperature measurements taken after a valve is closed, whereby the closing of the valve prevents pressurized fluid from entering the generator. The second time may correspond to last pressure and temperature measurements taken before the valve is opened, whereby the opening of the valve allows pressurized fluid to enter the generator.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
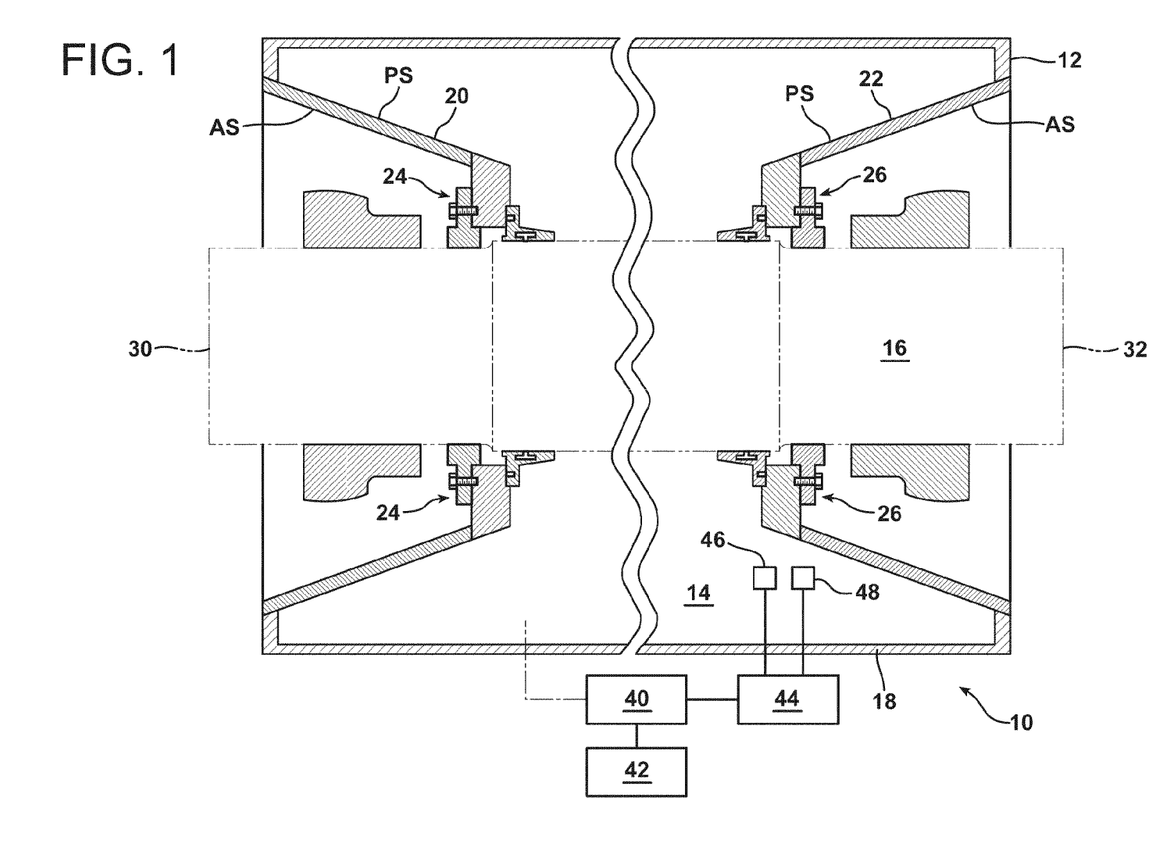
FIG. 1 is a diagrammatic cross sectional view of portion of a turbine generator including a pressure regulation circuit according to an embodiment of the invention.

FIG. 1 diagrammatically illustrates a portion of a turbine generator 10 having a generator frame 12 that defines an internal chamber 14. The internal chamber 14 is adapted to receive a pressurized fluid that provides cooling to components in the generator 10. In the embodiment shown, the pressurized fluid comprises pressurized hydrogen gas, but may comprise any suitable fluid. The generator frame 12 houses a power generator comprising a stator (not shown) and a rotor (only a rotatable shaft 16 of the rotor is illustrated in FIG. 1). The frame 12 comprises a main body 18 and first and second end shields 20, 22 coupled to the main body 18. The end shields 20, 22 each comprise an inner pressurized fluid side PS and an outer air side AS.

The generator 10 further includes first and second shaft seal assemblies 24, 26, respectively, disposed about opposing end portions 30, 32 of the rotatable shaft 16. The first and second shaft seal assemblies 24, 26 are coupled to the first and second end shields 20, 22 and sealingly engage the rotatable shaft 16. The first and second shaft seal assemblies 24, 26 provide a substantially fluid tight seal with the rotatable shaft 16 to prevent air from entering the generator frame internal chamber 14 and also to prevent the pressurized fluid from escaping from the generator frame internal chamber 14. It is noted that, a small amount of the pressurized fluid typically leaks out of the generator frame internal chamber 14 through the first and second shaft seal assemblies 24, 26. Pressurized fluid may also escape out of the generator frame internal chamber 14 through gasketed covers (not shown) and sealed joints (not shown) within the generator frame 12. According to various aspects of the present invention, a rate of leakage of the pressurized fluid from the generator frame internal chamber 14 is calculated, as will be described in detail herein.

During operation of the generator 10, components disposed within the generator frame 12 are cooled with the pressurized fluid, which pressurized fluid is provided into the generator frame internal chamber 14 via a pressure regulation circuit 40. Additional details in connection with the pressure regulation circuit 40 will be discussed below. As discussed above, the pressurized fluid within the generator frame internal chamber 14 may leak through the first and second shaft seal assemblies 24, 26, the gasketed covers, and/or the sealed joints. The pressurized fluid that leaks out from the generator frame internal chamber 14 must be replenished to maintain a pressure of the pressurized fluid within the generator 10 within a predetermined pressure range. The predetermined pressure range is defined by predetermined upper and lower alarm pressures, which will be discussed in detail herein.

The pressure regulation circuit 40 controls a flow of the pressurized fluid into the generator 10, which pressurized fluid in the embodiment shown comprises hydrogen gas, as noted above. As shown in FIG. 1, the pressure regulation circuit 40 is in fluid communication with a pressurized fluid source 42, from which the pressure regulation circuit 40 receives pressurized fluid for delivery into the generator frame internal chamber 14.

The pressure regulation circuit 40 includes one or more components, which will be discussed herein, that are in electrical communication with a controller 44. The controller 44 receives pressure and temperature readings from within the generator frame internal chamber 14 via respective pressure and temperature sensors 46, 48 that are each located in the generator frame internal chamber 14. It is noted that the pressure and temperature sensors 46, 48 could be combined as a single sensor that measures both pressure and temperature readings within the generator frame internal chamber 14.

Figure 2:
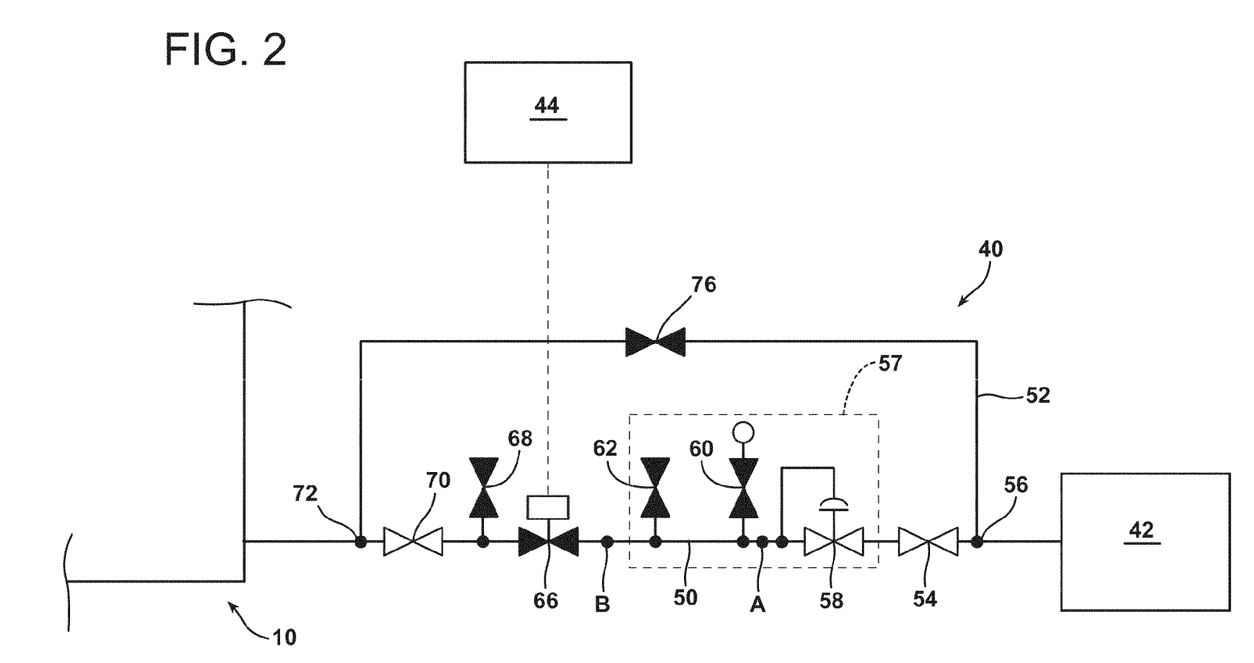
FIG. 2 is a diagrammatic illustration of the pressure regulation circuit illustrated in FIG. 1.

Referring to FIG. 2, a diagrammatic illustration of the pressure regulation circuit 40 is shown. The pressure regulation circuit 40 includes a main circuit 50 and a bypass circuit 52 branched off from the main circuit 50, wherein each circuit comprises a series of tubes for conveying the pressurized fluid therethrough.

The main circuit 50 is in fluid communication with the fluid source 42 and receives fluid therefrom. A first secondary valve 54 is positioned in the main circuit 50 downstream from a first location 56 where the bypass circuit 52 branches off from the main circuit 50. The first secondary valve 54 may be a manually operated valve, which can be selectively opened/ closed to allow/prevent the flow of fluid through the remaining portion of the main circuit 50, as will be discussed in detail below. It is noted that the first secondary valve 54 could be electronically controlled by the controller 44 without departing from the spirit and scope of the invention.

Pressure regulator structure 57 according to the embodiment shown comprises a pressure regulator 58, a pressure gauge 60, and a vent valve 62. The pressure regulator 58 is located in the main circuit 50 downstream from the first secondary valve 54. The pressure regulator 58 receives pressurized fluid from the fluid source 42 when the first secondary valve 54 is in an open position. The pressure regulator 58 regulates or reduces the pressure of the pressurized fluid from the fluid source 42 to a regulated pressure at point A in the main circuit 50, see FIG. 2.

The pressure gauge 60 and the vent valve 62 may be associated with the pressure regulator 58 for setting a predetermined output pressure for the pressure regulator structure 57 at point B. When the vent valve 62 is closed, the pressure at point B is substantially equal to the pressure at point A. Hence, to set the pressure output by the pressure regulator structure 57 at point B in the main circuit, the pressure at point A is set. To set the pressure at point A, a second secondary valve 70, which will be discussed below, may be closed, and the first secondary valve 54 may be opened slightly to allow a small amount of pressurized fluid to flow there through to the pressure regulator 58. The vent valve 62 may be opened such that the pressurized fluid can continually flow into and through the pressure regulator 58 during the setting of the pressure regulator 58. The pressure of the pressurized fluid is regulated/reduced by the pressure regulator 58, and the pressure gauge 60 measures the pressure of the pressurized fluid exiting the pressure regulator 58 at point A. The pressure regulator 58 can be manually adjusted so that the pressure exiting the pressure regulator 58 at point A is substantially equal to the desired predetermined output pressure at point B.

During normal operation of the turbine generator 10, the pressure regulator 58 can be adjusted to reduce the pressure at point A if it is determined that the pressure of the pressurized fluid exiting the pressure regulator 58 at point A is greater than the desired predetermined output pressure at point B. Further, if the pressure exiting the pressure regulator 58 at point A is less than the desired predetermined output pressure, the pressure regulator 58 can be adjusted to increase the pressure at point A. Or, the pressure regulator 58, the pressure gauge 60, and the vent valve 62 may be used to reset the pressure of the pressurized fluid exiting the pressure regulator 58 at point A, as discussed above, where the second secondary valve 70 is closed.

According to the present invention, the predetermined output pressure at point B in the main circuit 50 is greater than a desired internal operating pressure of the generator 10, and is less than the predetermined upper alarm pressure. Exemplary pressures of the exemplary generator 10 described herein may comprise: a desired operating pressure of the generator 10 of about 75 pounds per square inch (psi); a predetermined upper alarm pressure of about 80 psi; and a predetermined output pressure at point B in the main circuit 50 of about 78 psi. It is noted that the predetermined upper alarm pressure and the predetermined output pressure at point B in the main circuit 50 are preferably set with reference to the desired operating pressure. For example, the predetermined upper alarm pressure may be set about 5 psi higher than the desired operating pressure, and the predetermined output pressure at point B in the main circuit 50 may be set about 3 psi higher than the desired operating pressure.

It is noted that, although the pressure regulator structure 57 in the illustrated embodiment includes a pressure regulator 58, a pressure gauge 60, and a vent valve 62, which are collectively used to output the fluid at the desired predetermined output pressure at point B, it is understood that the pressure regulator structure 58 alone may be capable of outputting the fluid at the desired predetermined output pressure. In such a case, the pressure regulator structure 57 may comprise only the pressure regulator 58, which may be electronically controlled by the controller 44 according to pressure readings within the generator frame internal chamber 14 taken by the pressure sensor 46. Alternatively, two or more of the pressure regulator 58, the pressure gauge 60, and the vent valve 62 may be integrated into a single structure.

A primary valve 66 is located in the main circuit 50 downstream from the pressure regulator 58. The primary valve 66 according to the embodiment shown is an electronically controlled solenoid valve. The primary valve 66 may be in electrical communication with the controller 44, wherein the controller 44 may cause the primary valve 66 to selectively open and close according to a scheme that will be described in detail below.

Optionally, a relief valve 68 may be located in the main circuit 50 downstream of the primary valve 66. The relief valve 68 may be selectively opened if it is desirable to relieve pressure from the pressure regulation circuit 40 and the generator frame internal chamber 14, but is normally in a closed position. The relief valve 68 may be opened to relieve pressure from the pressure regulation circuit 40 and the generator frame internal chamber 14 if the regulator 58 does not correctly control the pressure, i.e., delivers a pressure that is too high, and the primary valve 66 malfunctions, i.e., fails to close when the pressure within the generator frame internal chamber 14 is greater than a predetermined level, as will be discussed below. Operation of the relief valve 68 may be performed manually, i.e., the relief valve 68 may be manually opened if the pressure within the generator frame internal chamber 14, or if a pressure at point A, is determined to be at or above a predetermined level. Or, operation of the relief valve 68 may be facilitated by the controller 44, i.e., the relief valve 68 may be controlled by the controller 44 to open automatically if the pressure within the generator frame internal chamber 14, or if a pressure measured by the pressure gauge 60 at point A, is determined to be at or above a predetermined level. As another alternative, the relief valve 68 may be configured to open automatically upon the pressure of the fluid passing through it being at or above a predetermined level. This could be effected using a spring (not shown) having a compression that is adjusted such that the spring maintains the relief valve 68 in a closed position if the pressure of the fluid flowing through the relief valve 68 is less than the predetermined level, but the spring allows the relief valve 68 to open if the pressure of the fluid flowing through the relief valve 68 is at or above the predetermined level.

The second secondary valve 70 is located in the main circuit 50 downstream from the relief valve 68 and upstream from a second location 72 where the bypass circuit 52 rejoins the main circuit 50. The second secondary valve 70 can be manually operated valve, which can be selectively opened/closed to allow/prevent fluid to flow therethrough, as noted above and further discussed below. It is noted that the second secondary valve 70 could be electronically controlled by the controller 44 without departing from the spirit and scope of the invention.

The main circuit 50 is in fluid communication with the generator frame internal chamber 14 downstream from the second location 72 where the bypass circuit 52 rejoins the main circuit 50. Pressurized fluid is delivered into the generator frame internal chamber 14 according to a method that will be described in detail below.

It is noted that, rather than rejoining the main circuit 50 at the second location 72, the bypass circuit 52 may be in direct fluid communication with the generator frame internal chamber 14 without departing from the spirit and scope of the invention.

The bypass circuit 52 includes a bypass valve 76, which may be a manually operated valve and can be selectively opened if it is desirable to allow fluid to pass through the bypass circuit 52, but is normally in a closed position, such that fluid is not permitted to pass through the bypass circuit 52. Additional details in connection with operation of the bypass circuit 52 will be discussed below. It is noted that the bypass valve 76 could be electronically controlled by the controller 44 without departing from the spirit and scope of the invention. It is also noted that valves (not shown) may be located at the first and second locations 56 and 72 for controlling flow into and out of the bypass circuit 52 if desired.

Figure 3:
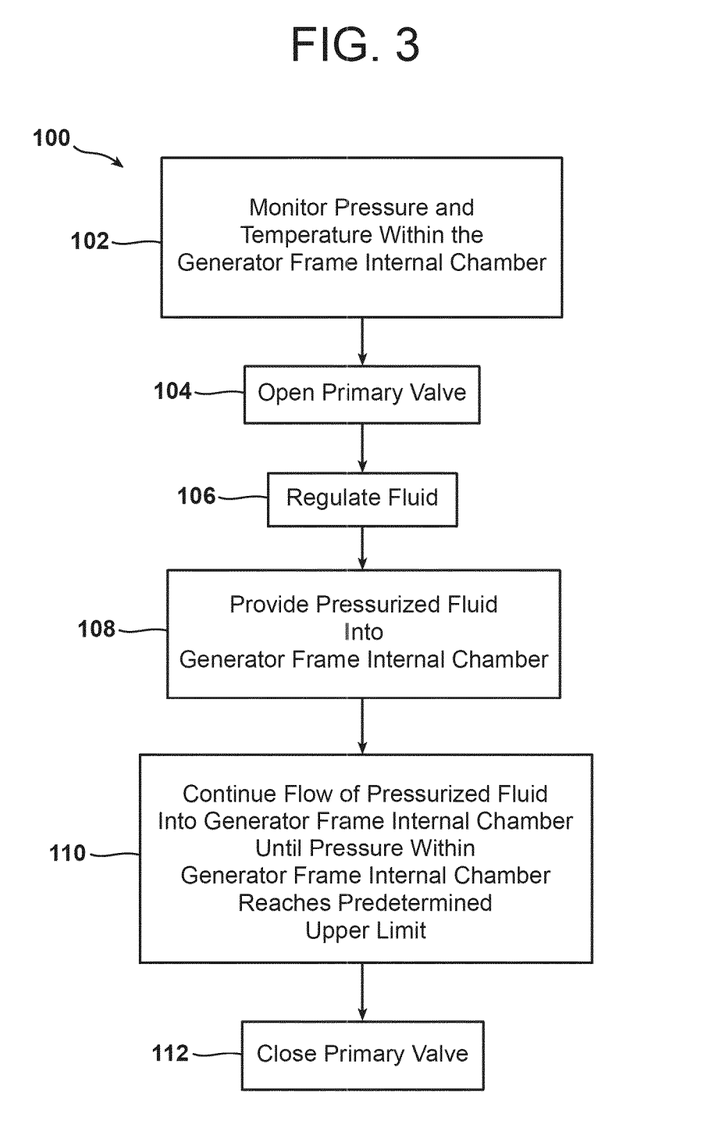
FIG. 3 is a flow chart illustrating steps for operating a turbine generator according to various aspects of the present invention.

Referring to FIG. 3, steps for carrying out a method 100 of operating the generator 10 are illustrated. Initial operation as described herein with reference to FIG. 3 assumes that both the first and second secondary valves 54 and 70 are in open positions, such that fluid is free to flow through the components of the main circuit 50 described above. Further, initial operation assumes that the bypass valve 76 is in a closed position, such that fluid is not permitted to flow through the bypass circuit 52. If these assumptions are not correct, the secondary valves 54 and 70 may be opened and the bypass valve 76 may be closed such that these conditions are fulfilled.

The controller 44 monitors the pressure within the generator frame internal chamber 14 via pressure readings taken by the pressure sensor 46 at step 102. The controller 44 may also monitor the temperature within the generator frame internal chamber 14 via temperature readings taken by the temperature sensor 48 at step 102.

Upon the pressure within the generator frame internal chamber 14 being at or below a predetermined lower limit, the controller 44 causes the primary valve 66 to open at step 104.

When the primary valve 66 is open, pressurized fluid flows from the fluid source 42 through the first secondary valve 54 and into the pressure regulator structure 57, wherein the pressure regulator structure 57 regulates/reduces the pressure of the fluid to the predetermined output pressure at point B in the main circuit 50, see step 106. The pressure of the fluid output by the fluid source 42 is greater than the desired predetermined output pressure at point B, and, in the illustrated embodiment, is in a range from about 100 psi to about 200 psi, and in a preferred embodiment is equal to about 150 psi.

The predetermined lower limit is less than or equal to the desired operating pressure of the generator 10 and is greater than the predetermined lower alarm pressure. As noted above, exemplary pressures are: 75 psi for the desired operating pressure; and about 78 psi for the predetermined output pressure at point B in the main circuit 50. The predetermined lower limit in a preferred embodiment is the same pressure or slightly less than the desired operating pressure, i.e., about 75 psi in the exemplary embodiment described herein. The predetermined lower alarm pressure may be set with reference to the desired operating pressure. For example, the predetermined lower alarm pressure may be set to about 1 psi less than the desired operating pressure, which predetermined lower alarm pressure in the exemplary embodiment described herein may be about 74 psi.

Once the primary valve 66 is opened at step 104 and the pressurized fluid is regulated/reduced by the pressure regulator structure 57 at step 106, the pressurized fluid flows through the primary valve 66, through the second secondary valve 70, and into the generator frame internal chamber 14 at step 108. Upon entering the generator frame internal chamber 14, the pressurized fluid provides cooling to components within the generator frame 12.

The flow of the pressurized fluid into the generator frame internal chamber 14 is continued until the pressure within the generator frame internal chamber 14 reaches a predetermined upper limit at step 110. The predetermined upper limit may be set with reference to the desired operating pressure. For example, the predetermined upper limit may be set to about 1 psi above the desired operating pressure, which predetermined upper limit in the exemplary embodiment described herein may be about 76 psi. It is noted that the predetermined upper limit is no greater than the predetermined output pressure at point B. Thus, the pressure within the generator frame internal chamber 14 can reach the predetermined upper limit via the pressurized fluid entering the generator frame internal chamber 14 having a pressure equal to the predetermined output pressure at point B.

Upon the pressure within the generator frame internal chamber 14 reaching the predetermined upper limit, the controller 44 causes the primary valve 66 to close at step 112. As noted above, the predetermined upper limit is no greater than the predetermined output pressure at point B. Further, the predetermined upper limit is greater than each of the predetermined lower limit and the desired operating pressure.

Upon the closing of the primary valve 66, further pressurized fluid is prevented from passing therethrough, such that the pressurized fluid supply to the generator frame internal chamber 14 is cut off. It is noted that, since both the primary valve 66 and the bypass valve 76 are both closed under these conditions, fluid no longer flows from the fluid source 42, through the pressure regulator structure 57, and into the generator frame internal chamber 14.

It is noted that, according to aspects of the invention described herein, since the predetermined output pressure at point B is set below the predetermined upper alarm pressure, even in the case of a malfunction of the primary valve 66, which results in the primary valve 66 failing to close upon the pressure within the generator frame internal chamber 14 reaching or exceeding the predetermined upper limit, the generator frame internal chamber 14 should not become over pressurized. That is, even when the primary valve 66 malfunctions, the pressure of the pressurized fluid entering the generator frame internal chamber 14 should not exceed the predetermined upper alarm pressure since the predetermined output pressure at point B is below the predetermined upper alarm pressure. Hence, continued introduction of the pressurized fluid into the generator frame internal chamber 14 at the predetermined output pressure at point B will not cause the pressure within the generator frame internal chamber 14 to rise above the predetermined upper alarm pressure.

The method 100 described above illustrates a normal operation of the generator 10. However, under certain operating circumstances, operation of the generator 10 may vary from the method 100 described in FIG. 3.

For example, if the pressure within the generator frame internal chamber 14 is determined to be above the predetermined upper alarm pressure, e.g., due to the primary valve 66 malfunctioning, the first and second secondary valves 54, 70 may be closed, such that pressurized fluid is prevented from flowing through the main circuit 50 and into the generator frame internal chamber 14. Alternatively, if the pressure within the generator frame internal chamber 14 is determined to be above the predetermined upper alarm pressure, the first secondary valve 54 may be closed and the second secondary valve 70 may remain open, and the relief valve 68 may be opened. In this case, pressure from within the generator frame internal chamber 14 may be relieved via the relief valve 68 to bring the pressure within the generator frame internal chamber 14 below the predetermined upper alarm pressure.

As another example, if the pressure within the generator frame internal chamber 14 is determined to be below the predetermined lower alarm pressure, the bypass valve 76 may be opened, such that pressurized fluid from the fluid source 42 may pass through the bypass circuit 52 and into the generator frame internal chamber 14. The primary valve 66 and/or the bypass valve 76 may remain open until the pressure within the generator frame internal chamber 14 reaches the predetermined upper limit. Alternatively, the bypass valve 76 may be closed upon the pressure within the generator frame internal chamber 14 surpassing the predetermined lower alarm pressure, in which case the pressurized fluid from the main circuit 50 alone could continue to be supplied to the generator frame internal chamber 14 until the pressure therein reaches the predetermined upper limit.

As yet another example, it may be desirable to perform an inspection of the main circuit 50. In this example, the first and second secondary valves 54, 70 may be closed, such that pressurized fluid is prevented from flowing to the components of the main circuit 50 located therebetween. Thus, inspection and/or maintenance of these components can be performed. During the time where the first and second secondary valves 54, 70 are closed, pressurized fluid can be delivered into the generator frame internal chamber 14 via the bypass circuit 52, i.e., by opening the bypass valve 76. If it is desirable to cut off the pressurized fluid supply into the generator frame internal chamber 14, the bypass valve 76 can be closed.

As a further example, if a rate of consumption of the pressurized fluid is determined to be too high, the first and second secondary valves 54, 70 may be closed. In addition or as an alternative, the generator 10 may be shut down, such as to allow for an opportunity to discover the cause of the high consumption rate.

Figure 4:
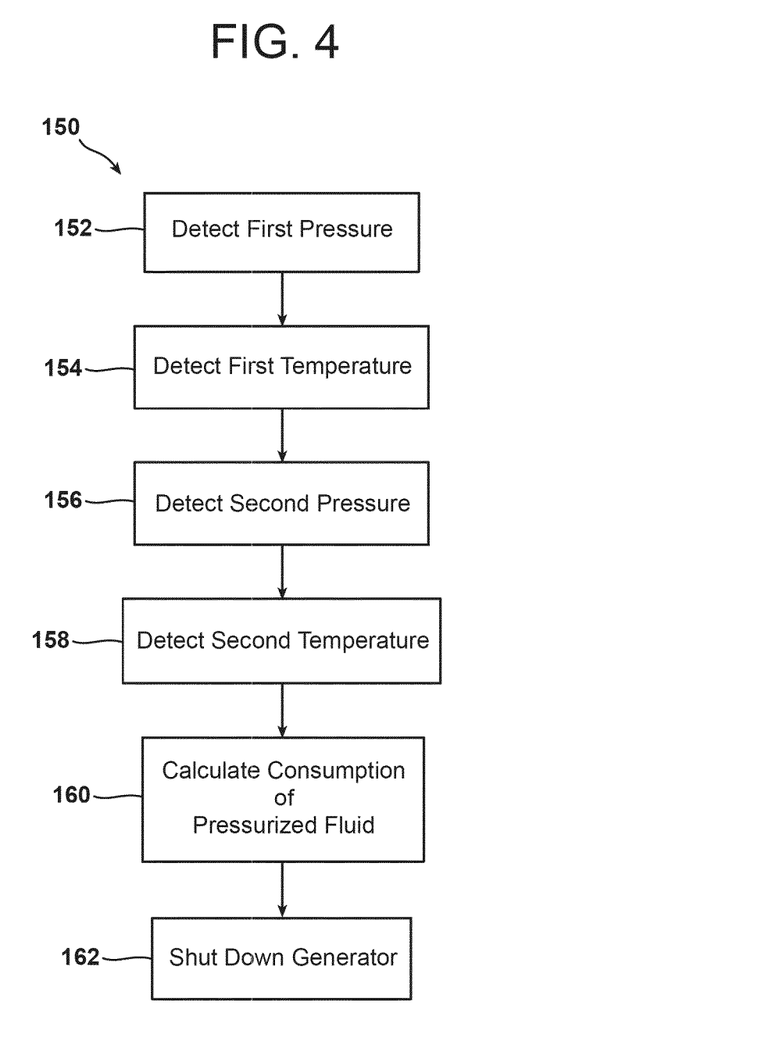
FIG. 4 is a flow chart illustrating steps for determining leakage of a pressurized fluid from a turbine generator according to various aspects of the present invention.

Following this example, referring to FIG. 4, a method 150 for determining leakage of the pressurized fluid from the generator frame internal chamber 14 is illustrated.

At step 152, a first pressure of the pressurized fluid within the generator frame internal chamber 14 is detected at a first time. The first pressure may be determined by the pressure sensor 46 and communicated to the controller 44.

At step 154, a first temperature of the pressurized fluid within the generator frame internal chamber 14 is detected at the first time. The first temperature may be determined by the temperature sensor 48 and communicated to the controller 44.

At step 156, a second pressure of the pressurized fluid within the generator frame internal chamber 14 is detected at a second time. The second pressure may be determined by the pressure sensor 46 and communicated to the controller 44.

At step 158, a second temperature of the pressurized fluid within the generator frame internal chamber 14 is detected at the second time. The second temperature may be determined by the temperature sensor 48 and communicated to the controller 44.

At step 160, the leakage of the pressurized fluid from the first time to the second time is calculated based on the first pressure, the first temperature, the second pressure, and the second temperature. For example, calculating the leakage of the pressurized fluid may comprise determining a first mass of the pressurized fluid within the generator frame internal chamber 14 based on the first pressure, the first temperature, a known volume within the generator frame internal chamber 14, a known molar mass or molecular weight of the pressurized fluid, and the universal gas constant, wherein the known volume, the molar mass of the pressurized fluid, and the universal gas constant are fixed variables.

The calculation can be made, for example, using two equations, which may be performed, for example, by a computer processing device. The first is the ideal gas law equation ($pV=nRT$), where p is the absolute pressure of the gas; V is the volume of the gas, which is equal to the volume of the generator frame internal chamber 14; n is the amount of substance of the gas in units of moles; R is the gas constant ($8.314472$ $JK^{-1}$ $mol^{-1}$); and T is the absolute temperature. This equation can be used to determine n, which is the amount of substance of the gas in units of moles.

The mass of the pressurized fluid can then be determined, for example, from the amount of substance of the gas (moles) using the equation: $M=(n)(X)$, where M is the mass, n is the amount of substance of the gas in units of moles (calculated above using the equation $pV=nRT$), and X is the known molar mass of the pressurized fluid.

Further, a second mass of the pressurized fluid within the generator frame internal chamber 14 may be determined using the same equations discussed above, based on the second pressure, the second temperature, the known volume within the generator frame internal chamber 14, the known molar mass of the pressurized fluid, and the universal gas constant.

The leakage of the pressurized fluid from the first time to the second time could be calculated by determining the difference between the first mass and the second mass. The leakage of the pressurized fluid could be used to calculate a rate of loss of the pressurized fluid, such as a rate of loss per day. This can be done by dividing the mass loss by the time between the first time and the second time, and then converting to desired parameters. It is understood that modifications may be made to simplify the above equations, such as by removing fixed variables from the equations to determine the leakage of the pressurized fluid from the first time to the second time. Further, alternative equations may be used to determine the leakage of the pressurized fluid from the first time to the second time without departing from the spirit and scope of the invention.

According to aspects of the invention, the first time may correspond to first pressure and temperature measurements taken after the primary valve 66 is closed, whereby the closing of the primary valve 66 prevents pressurized fluid from entering the generator frame internal chamber 14, i.e., just after a time period where pressurized fluid is supplied to the generator frame internal chamber 14 to bring the pressure within the generator frame internal chamber 14 to the predetermined upper limit. The second time may correspond to last pressure and temperature measurements taken before the primary valve 66 is opened, whereby the opening of the primary valve 66 allows pressurized fluid to enter the generator frame internal chamber 14, i.e., just before a time period where pressurized fluid is supplied to the generator frame internal chamber 14 as a result of the pressure within the generator frame internal chamber 14 being equal to the predetermined lower limit.

As an example, assume that the supply of pressurized fluid into the generator frame internal chamber 14 has just been stopped, i.e., by closing the primary valve 66, as a result of the pressure within the generator frame internal chamber 14 reaching 76 psi. Pressure and temperature measurements within the generator frame internal chamber 14 immediately after the closing of the primary valve 66 are taken, and read 76 psi and 115 degrees F., respectively. These pressure and temperature readings correspond to a first time $T_1$.

After a period of time, e.g., 720 minutes for this example, the pressure drops to 75 psi, which causes the opening of the primary valve 66, such that pressurized fluid is introduced into the generator frame internal chamber 14. Just prior to the opening of the primary valve 66, pressure and temperature measurements within the generator frame internal chamber 14 are taken, and read 75 psi and 113 degrees F. These pressure and temperature readings correspond to a second time $T_2$.

The equation (pV=nRT) discussed above can be used to calculate the amount of substance of the gas in units of moles ($n_1$) corresponding to the first time $T_1$. The mass ($M_1$) of the pressurized fluid at the first time $T_1$ can then be determined using the equation $M_1=(n_1)(X)$ discussed above. These equations can be used again to determine the amount of substance of the gas in units of moles ($n_2$) corresponding to the second time $T_2$, which can be used to determine the mass ($M_2$) of the pressurized fluid at the second time $T_2$.

The mass $M_2$ at the second time $T_2$ can be subtracted from the mass $M_1$ at the first time $T_1$ to determine the mass loss of the pressurized fluid from time $T_1$ to time $T_2$. The period of time can be used to determine the leakage rate of the pressurized fluid over the particular period of time. In the case of this example, the leakage rate would be equal to $(M_1-M_2)/720$ minutes. The leakage rate in this case could be converted into a leakage rate per day by multiplying both the numerator ($M_1-M_2$) and the denominator (720 minutes) by 2, such that the denominator is equal to 1440 minutes, or 1 day.

It is noted that, in this example, a portion of the pressure difference between the first time $T_1$ and the second time $T_2$ would be attributed to the temperature difference between the first time $T_1$ and the second time $T_2$, rather than being attributed to leakage. Since the pressure and temperature measurements are accounted for in the equations that are being used to determine the mass difference between the first time $T_1$ and the second time $T_2$, a highly accurate leakage rate can be calculated using the method 150.

If the calculated leakage rate of the pressurized fluid from the first time $T_1$ to the second time $T_2$ exceeds a predetermined limit, the generator 10 is shut down at step 162. An exemplary predetermined limit could be a leakage rate of the pressurized fluid of about 20 pounds/day, if the pressurized fluid comprises 98% hydrogen and 2% air, and could be about to 27 pounds/day, if the pressurized fluid comprises 95% hydrogen and 5% air. These rates of loss correspond to a volumetric leakage rate of the pressurized fluid of about 500 ft$^3$/day. It is noted that these values could vary drastically depending on the particular generator 10 being used and the company using it. The leakage rate of the pressurized fluid can be calculated frequently, such that high leakage rates can be determined quickly after increases in consumption of the pressurized fluid. Thus, the amount of time that the generator 10 runs with a high leakage rate may be reduced, which may prevent the waste of fluid.

The method 150 for determining the leakage of the pressurized fluid described herein can be performed without the use of a flow meter to monitor the flow of the pressurized fluid into the generator 10. By eliminating the need for a flow meter to determine the leakage of the pressurized fluid, a cost and complexity of the pressure regulation circuit 40 are believed to be reduced as opposed to prior art circuits that include a flow meter.

Further, since the method 150 takes into consideration both the temperature and the pressure within the generator frame internal chamber 14, the accuracy of leakage calculations of the pressurized fluid out of the generator frame internal chamber 14 is believed to be increased over prior art methods that do not take into account the pressure or temperature within the generator frame internal chamber 14. For example, when the temperature within the generator frame internal chamber 14 decreases, in order to keep the pressure therein constant, additional pressurized fluid may be introduced into the generator frame internal chamber 14. In this case, while pressurized fluid is introduced into the generator frame internal chamber 14, the additional pressurized fluid was not added as a result of a leak. Rather, the pressurized fluid was added to account for the decrease in temperature.

Under prior art methods that calculate leakage using a flow meter to determine an amount of pressurized fluid that has passed into the generator 10, all added pressurized fluid may be attributed to leakage, since the prior art leakage calculation does not take into account the temperature and pressure within the generator frame internal chamber 14. That is, prior art methods that rely solely on flow meters for determining leakage consider that all flow into the generator frame internal chamber 14 is attributed to leakage. However, since the method 150 described herein takes into account both the pressure and the temperature within the generator frame internal chamber 14 when determining leakage, more accurate leakage rates can be determined.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A turbine generator including a pressure regulation circuit comprising:
   the turbine generator comprising a generator frame defining an internal chamber of the turbine generator and housing a portion of a turbine rotor;
   a controller that determines a pressure within the generator frame;
   the pressure regulation circuit including a main circuit comprising:
      pressure regulator structure that receives fluid, regulates the pressure of the fluid to a predetermined output pressure, and outputs the fluid at said predetermined output pressure, said predetermined output pressure being greater than a desired operating pressure of said generator frame and being less than a predetermined upper alarm pressure; and
      a primary valve downstream from said pressure regulator structure that is selectively opened and closed by said controller based on the pressure within said generator frame determined by said controller, wherein said controller:
         if said primary valve is closed, opens said primary valve to allow said pressurized fluid outputted from said pressure regulator structure to flow into said generator frame upon the pressure within the generator frame being at or below a predetermined lower limit, said predetermined lower limit being no greater than the desired operating pressure of the generator; and
         if said primary valve is open, closes said primary valve to prevent said pressurized fluid outputted from said pressure regulator structure from flowing into said generator frame upon the pressure within said generator frame being at or above a predetermined upper limit, said predetermined upper limit being no greater than said predetermined output pressure and being greater than said predetermined lower limit.

2. The turbine generator including the pressure regulation circuit of claim 1, wherein said pressure regulator structure comprises a pressure regulator, a pressure gauge and a vent valve.

3. The turbine generator including the pressure regulation circuit of claim 1, further comprising a relief valve downstream from said primary valve, said relief valve for selectively releasing an amount of the pressurized fluid from the pressure regulation circuit.

4. The turbine generator including the pressure regulation circuit of claim 1, further comprising a bypass circuit including a bypass valve that is normally in a closed position but can be selectively opened when it is desired to bypass said main circuit.

5. The turbine generator including the pressure regulation circuit of claim 4, wherein said bypass circuit is branched off from said main circuit at a location upstream from a first secondary valve of said main circuit that is upstream from said pressure regulator structure, and said bypass circuit rejoins said main circuit downstream from a second secondary valve of said main circuit that is downstream from said primary valve, wherein said first and second secondary valves are normally in open positions but can be selectively closed to prevent flow through said main circuit.

6. The turbine generator including the pressure regulation circuit of claim 1, wherein:
said predetermined output pressure is set at least 3 psi above said desired operating pressure;
said predetermined upper alarm pressure is set at least 5 psi above said desired operating pressure; and
said predetermined upper limit is set at least 1 psi above said desired operating pressure.

7. The turbine generator including the pressure regulation circuit of claim 1, wherein said controller receives temperature and pressure readings inside said generator frame from at least one sensor, wherein said temperature and pressure readings are used to determine leakage of the pressurized fluid from said generator frame.

8. The turbine generator including the pressure regulation circuit of claim 6, wherein said predetermined lower limit is set at said desired operating pressure.

9. A turbine generator including a pressure regulation circuit comprising:
the turbine generator comprising a generator frame defining an internal chamber of the turbine generator and housing a portion of a turbine rotor;
a controller that determines a pressure within the generator frame;
the pressure regulation circuit including a main circuit comprising:
pressure regulator structure that receives fluid, regulates the pressure of the fluid to a predetermined output pressure, and outputs the fluid at said predetermined output pressure, said predetermined output pressure being greater than a desired operating pressure of said generator frame and being less than a predetermined upper alarm pressure, said pressure regulator structure comprises a pressure regulator, a pressure gauge, and a vent valve;
a primary valve downstream from said pressure regulator structure that is selectively opened and closed by said controller based on the pressure within said generator frame determined by said controller, wherein said controller:
if said primary valve is closed, opens said primary valve to allow said pressurized fluid outputted from said pressure regulator structure to flow into said generator frame upon the pressure within said generator frame being at or below a predetermined lower limit, said predetermined lower limit being no greater than the desired operating pressure of the generator; and
if said primary valve is open, closes said primary valve to prevent said pressurized fluid outputted from said pressure regulator structure from flowing into said generator frame upon the pressure within said generator frame being at or above a predetermined upper limit, said predetermined upper limit being no greater than said predetermined output pressure and being greater than said predetermined lower limit; and
a relief valve downstream from said primary valve and said pressure regular structure, said relief valve for selectively releasing an amount of the pressurized fluid from the pressure regulation circuit.

10. The turbine generator including the pressure regulation circuit of claim 9, further comprising a bypass circuit including a bypass valve that is normally in a closed position but can be selectively opened when it is desired to bypass said main circuit.

11. The turbine generator including the pressure regulation circuit of claim 10, wherein said bypass circuit is branched off from said main circuit at a location upstream from a first secondary valve of said main circuit that is upstream from said pressure regulator, and said bypass circuit rejoins said main circuit downstream from a second secondary valve of said main circuit that is downstream from said primary valve, wherein said first and second secondary valves are normally in open positions but can be selectively closed to prevent flow through said main circuit.

12. The turbine generator including the pressure regulation circuit of claim 9, wherein:
said predetermined output pressure is set at least 3 psi above said desired operating pressure;
said predetermined upper alarm pressure is set at least 5 psi above said desired operating pressure; and
said predetermined upper limit is set at least 1 psi above said desired operating pressure.

13. The turbine generator including the pressure regulation circuit of claim 9, wherein said controller receives temperature and pressure readings inside said generator frame from at least one sensor, wherein said temperature and pressure readings are used to determine leakage of the pressurized fluid from said generator frame.

14. The turbine generator including the pressure regulation circuit of claim 9, wherein said relief valve is opened if the pressure within at least one of: said generator frame internal chamber; and said main circuit is determined to be at or above a predetermined level.

15. The turbine generator including the pressure regulation circuit of claim 14, wherein said pressure gauge and said vent valve are used in combination with said pressure regulator for setting said predetermined output pressure.

16. A turbine generator including a pressure regulation circuit comprising:
the turbine generator comprising a generator frame defining an internal chamber of the turbine generator and housing a portion of a turbine rotor;

a controller that determines a pressure within the generator frame;

the pressure regulation circuit including a main circuit comprising:

pressure regulator structure that receives fluid, regulates the pressure of the fluid to a predetermined output pressure, and outputs the fluid at said predetermined output pressure, said predetermined output pressure being greater than a desired operating pressure of said generator frame and being less than a predetermined upper alarm pressure;

a primary valve downstream from said pressure regulator structure that is selectively opened and closed by said controller based on the pressure within said generator frame determined by said controller, wherein said controller:

if said primary valve is closed, opens said primary valve to allow said pressurized fluid outputted from said pressure regulator structure to flow into said generator frame upon the pressure within said generator frame being at or below a predetermined lower limit, said predetermined lower limit being no greater than the desired operating pressure of the generator; and if said primary valve is open, closes said primary valve to prevent said pressurized fluid outputted from said pressure regulator structure from flowing into said generator frame upon the pressure within said generator frame being at or above a predetermined upper limit, said predetermined upper limit being no greater than said predetermined output pressure and being greater than said predetermined lower limit; and a bypass circuit including a bypass valve that is normally in a closed position but can be selectively opened when it is desired to bypass said main circuit, wherein said bypass circuit is branched off from said main circuit at a location upstream from a first secondary valve of said main circuit that is upstream from said pressure regulator structure, and said bypass circuit rejoins said main circuit downstream from a second secondary valve of said main circuit that is downstream from said primary valve, wherein said first and second secondary valves are normally in open positions but can be selectively closed to prevent flow through said main circuit.

17. The turbine generator including the pressure regulation circuit of claim 16, wherein:

said pressure regulator structure comprises a pressure regulator, a pressure gauge, and a vent valve; and said pressure gauge and said vent valve are used in combination with said pressure regulator for setting said predetermined output pressure.

18. The turbine generator including the pressure regulation circuit of claim 17, further comprising a relief valve downstream from said primary valve and said pressure regulator structure, wherein said relief valve is opened if the pressure within at least one of: said generator frame internal chamber; and said main circuit is determined to be at or above a predetermined level to release an amount of pressurized fluid from the at least one of: said generator frame internal chamber; and said main circuit.

19. The turbine generator including the pressure regulation circuit of claim 16, wherein:

said predetermined output pressure is set at least 3 psi above said desired operating pressure;

said predetermined upper alarm pressure is set at least 5 psi above said desired operating pressure; and said predetermined upper limit is set at least 1 psi above said desired operating pressure.

20. The turbine generator including the pressure regulation circuit of claim 16, wherein said controller receives temperature and pressure readings inside said generator frame from at least one sensor, wherein said temperature and pressure readings are used to determine leakage of the pressurized fluid from said generator frame.

* * * * *